(12) United States Patent
Homsangpradit et al.

(10) Patent No.: US 12,377,693 B2
(45) Date of Patent: Aug. 5, 2025

(54) REAR SUSPENSION FOR VEHICLE HAVING IMPROVED SWING ARM

(71) Applicant: APTERA MOTORS CORP., San Diego, CA (US)

(72) Inventors: Brian Homsangpradit, Murrieta, CA (US); Daniel Morris, San Marcos, CA (US); Justin Moreno, Murrieta, CA (US)

(73) Assignee: APTERA MOTORS CORP., San Diego, CA (US)

( * ) Notice: Subject to any disclaimer, the term of this patent is extended or adjusted under 35 U.S.C. 154(b) by 0 days.

(21) Appl. No.: 17/901,374

(22) Filed: Sep. 1, 2022

(65) Prior Publication Data

US 2024/0075780 A1 Mar. 7, 2024

(51) Int. Cl.
*B60G 3/20* (2006.01)
*B60G 7/00* (2006.01)

(52) U.S. Cl.
CPC .............. *B60G 3/207* (2013.01); *B60G 7/008* (2013.01); *B60G 2204/148* (2013.01)

(58) Field of Classification Search
CPC ... B60G 3/207; B60G 8/008; B60G 2204/148
See application file for complete search history.

(56) References Cited

U.S. PATENT DOCUMENTS

| | | |
|---|---|---|
| 5,116,069 A | 5/1992 | Miller |
| 5,364,121 A | 11/1994 | Lee |
| 5,810,383 A | 9/1998 | Anderson |
| 6,015,022 A | 1/2000 | Thuliez |
| 6,062,580 A * | 5/2000 | Kawabe ............... B60G 15/07 280/124.135 |
| 6,263,994 B1 * | 7/2001 | Eitel .................... B60T 8/261 180/219 |

(Continued)

FOREIGN PATENT DOCUMENTS

| | | | |
|---|---|---|---|
| CA | 3011142 A1 | 1/2019 | |
| JP | 2009101890 A * | 5/2009 | |
| WO | WO-2021048717 A1 * | 3/2021 | ....... B60G 15/067 |

OTHER PUBLICATIONS

JP2009101890A Machine English translation (Year: 2009).*

*Primary Examiner* — Jason D Shanske
*Assistant Examiner* — Matthew James O'Neill
(74) *Attorney, Agent, or Firm* — WASSERBAUER LAW, LLC; Damian G. Wasserbauer, Esq.; Nicholas E. Blanton, Esq.

(57) ABSTRACT

A dual trailing link, rear wheel suspension system for a vehicle is described. The trailing links have proximal ends coupled to the vehicle chassis and distal ends coupled to a bracket with a knuckle for the wheel. The distal ends have a larger distance between them than the proximal ends, allowing for an improved instantaneous center, which may be useful for determining lift/squat characteristics. The distal ends may be disposed proximate the knuckle, thereby providing the largest possible knuckle pivot radius, i.e., effective swingarm length, for a predetermined chassis-wheel distance, which provides a smoother, more comfortable riding experience. The disclosed arrangement makes maximum use of the space allotted for the rear suspension system and is suitable for use with an aerodynamic cowling for an energy efficient vehicle.

5 Claims, 10 Drawing Sheets

(56) References Cited

U.S. PATENT DOCUMENTS

| | | |
|---|---|---|
| 7,798,507 B2 | 9/2010 | Hirai |
| 8,540,045 B2 | 9/2013 | Hall et al. |
| 8,727,057 B2* | 5/2014 | Park .................... B62K 5/05 |
| | | 180/215 |
| 9,043,111 B2 | 5/2015 | Dagenais et al. |
| 9,272,744 B1 | 3/2016 | De Haan |
| 9,650,099 B2 | 5/2017 | Hall et al. |
| 10,300,971 B2 | 5/2019 | Holroyd et al. |
| 11,034,409 B2 | 6/2021 | Hebert et al. |
| 2006/0022421 A1* | 2/2006 | Dreher ................ B60G 9/027 |
| | | 280/124.104 |
| 2015/0130145 A1* | 5/2015 | Miyamori ............ B60G 3/14 |
| | | 280/5.507 |
| 2018/0265165 A1 | 9/2018 | Zawistowski |
| 2022/0153348 A1* | 5/2022 | Lee .................... B62D 17/00 |

* cited by examiner

REAR SUSPENSION FOR VEHICLE HAVING IMPROVED SWING ARM

TECHNICAL FIELD

The present invention relates to a suspension for a vehicle and, more particularly, to a rear suspension with an improved geometric characteristic such that an effective swingarm length can be increased for more vertical shock absorption while dual trailing links establish an instantaneous center that determine lift and squat characteristics. The invention also features a compact design useful for enclosing a rear suspension within an aerodynamic shell of a vehicle.

BACKGROUND

Figure 1A:
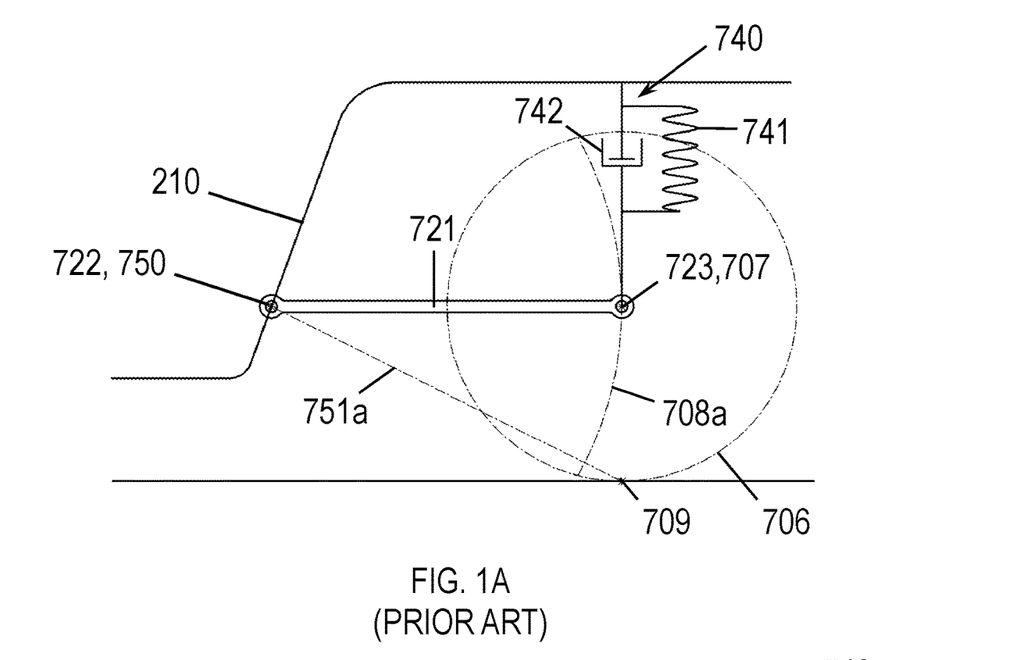
FIG. 1A is a schematic diagram of rear suspension system with a single trailing link, according to the prior art.
Figure 1B:
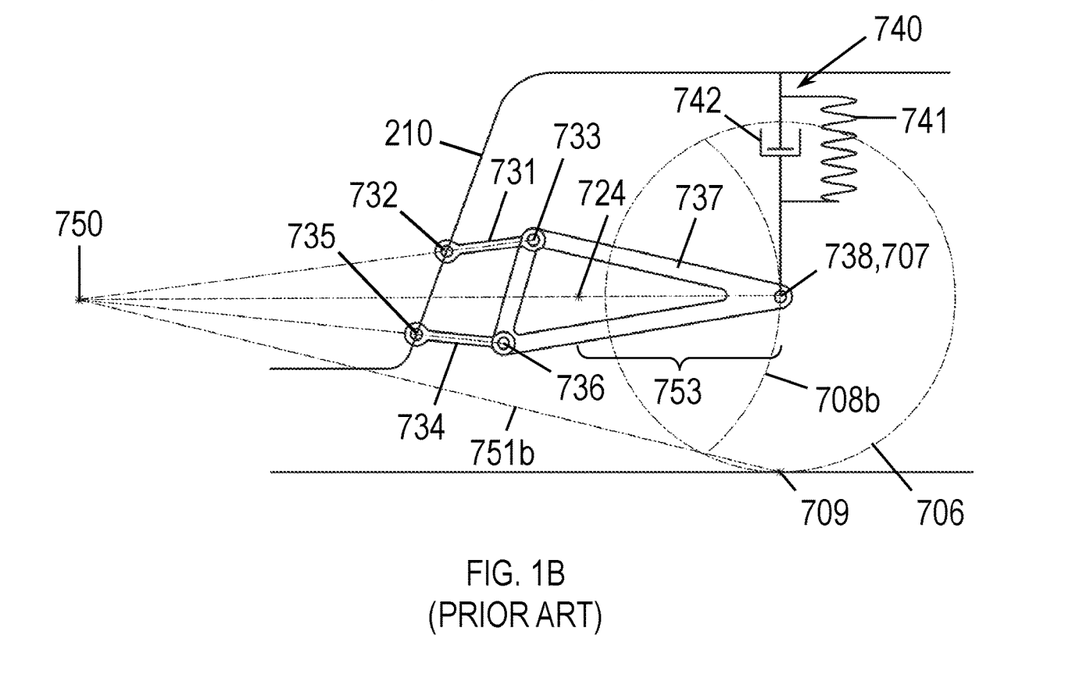
FIG. 1B is a schematic diagram of rear suspension system with dual trailing links and an extending bracket, according to the prior art.
Figure 2A:
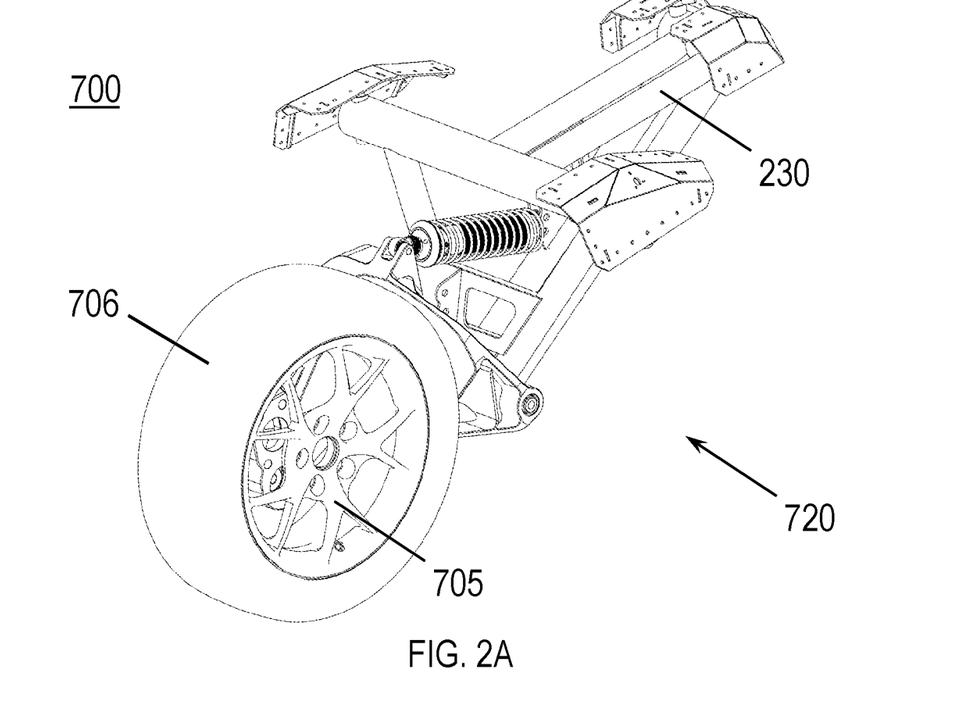
FIG. 2A illustrates a perspective view of a dual trailing link rear suspension, according to an embodiment of the present invention.
Figure 2B:
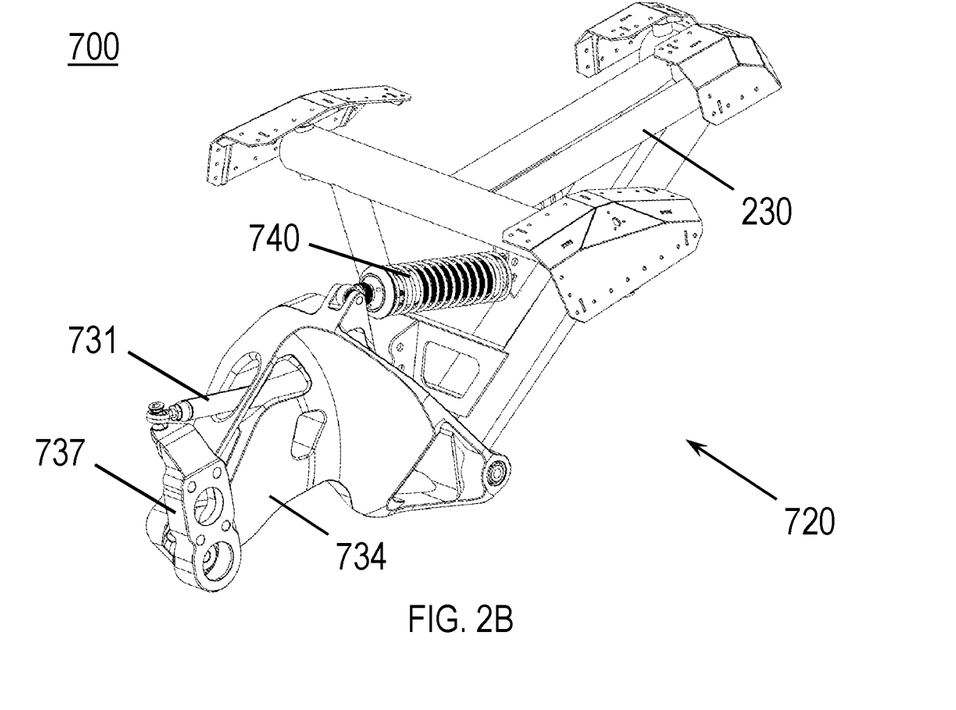
FIG. 2B illustrates a perspective view of a dual trailing link rear suspension with the rear wheel omitted for clarity, according to an embodiment of the present invention.
Figure 5A:
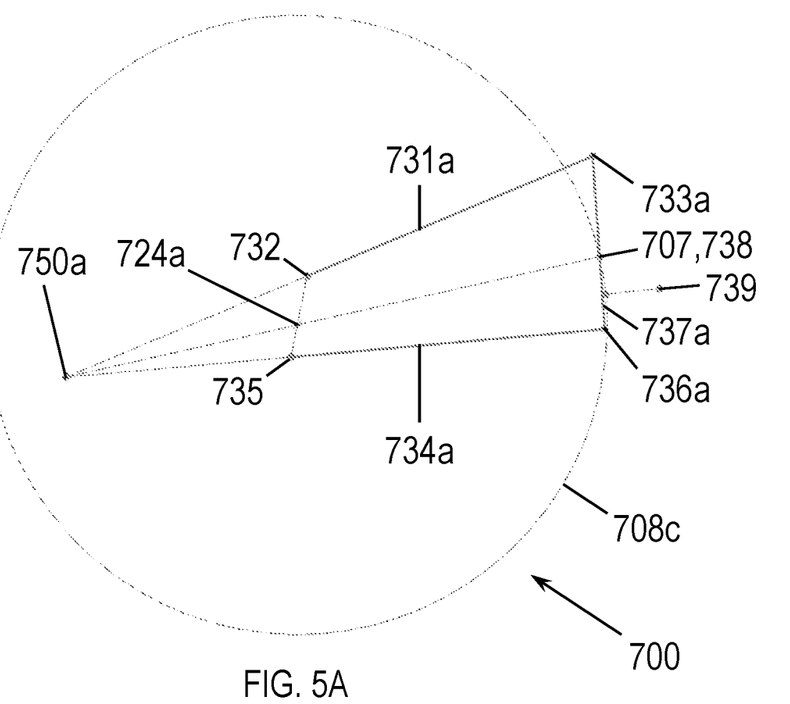
FIG. 5A shows a schematic diagram of the geometry of a rear suspension system in a maximum upward displacement state of the embodiment shown in FIG. 4A, and according to an embodiment of the present invention.
Figure 5B:
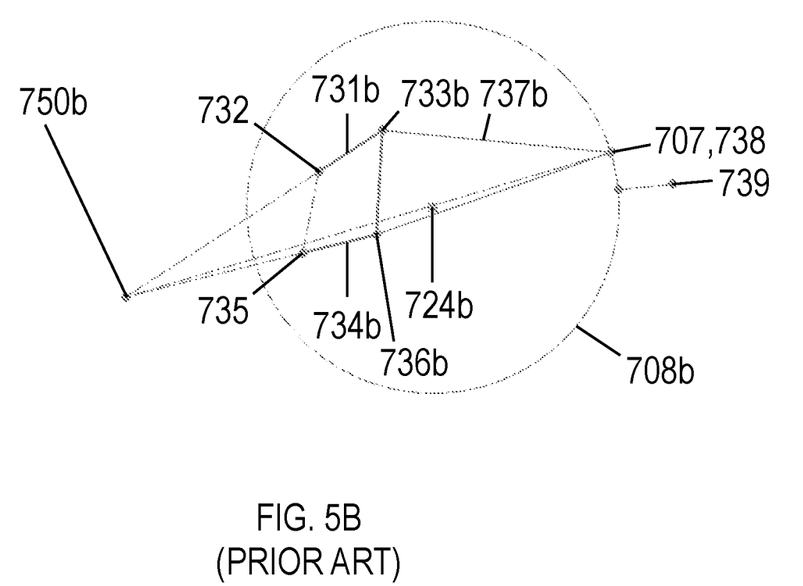
FIG. 5B shows a schematic diagram of the geometry of a rear suspension system in a maximum upward displacement state, according to the prior art.
Figure 6A:
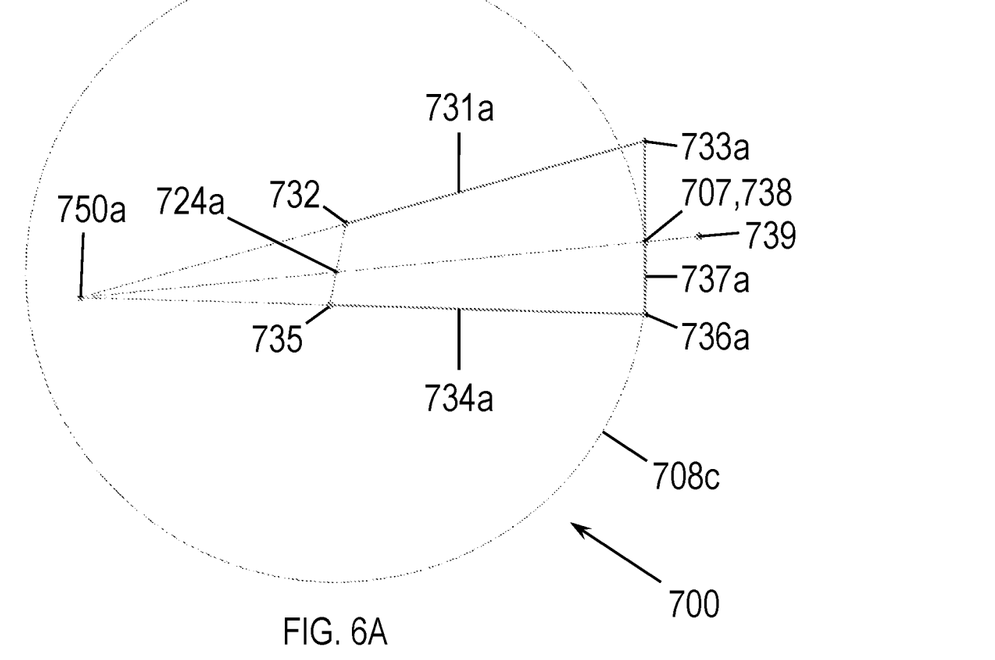
FIG. 6A shows a schematic diagram of the geometry of a rear suspension system in a neutral state, of the embodiment shown in FIG. 4B, and according to an embodiment of the present invention.
Figure 6B:
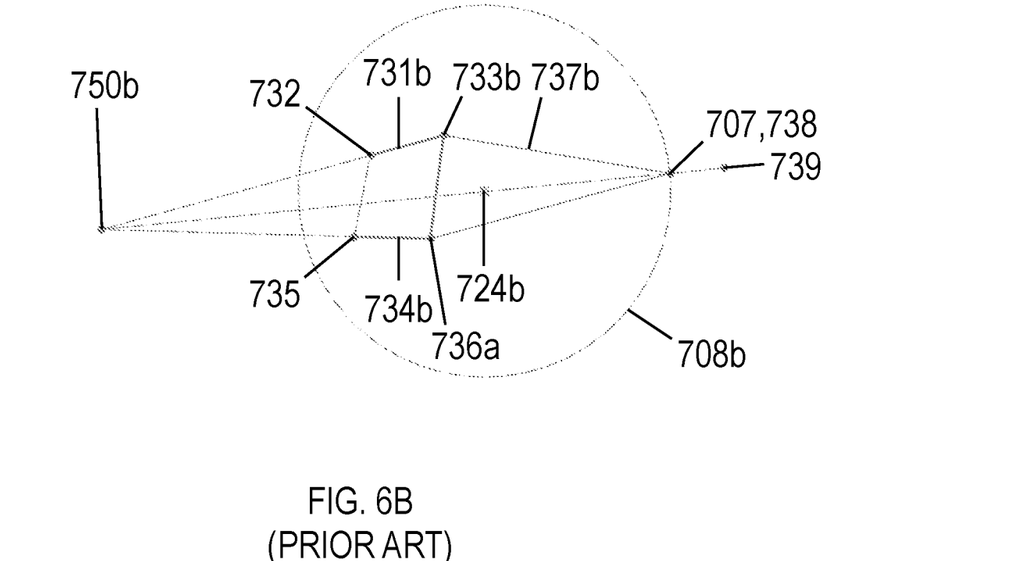
FIG. 6B shows a schematic diagram of the geometry of a rear suspension system in a neutral state, according to the prior art.
Figure 7A:
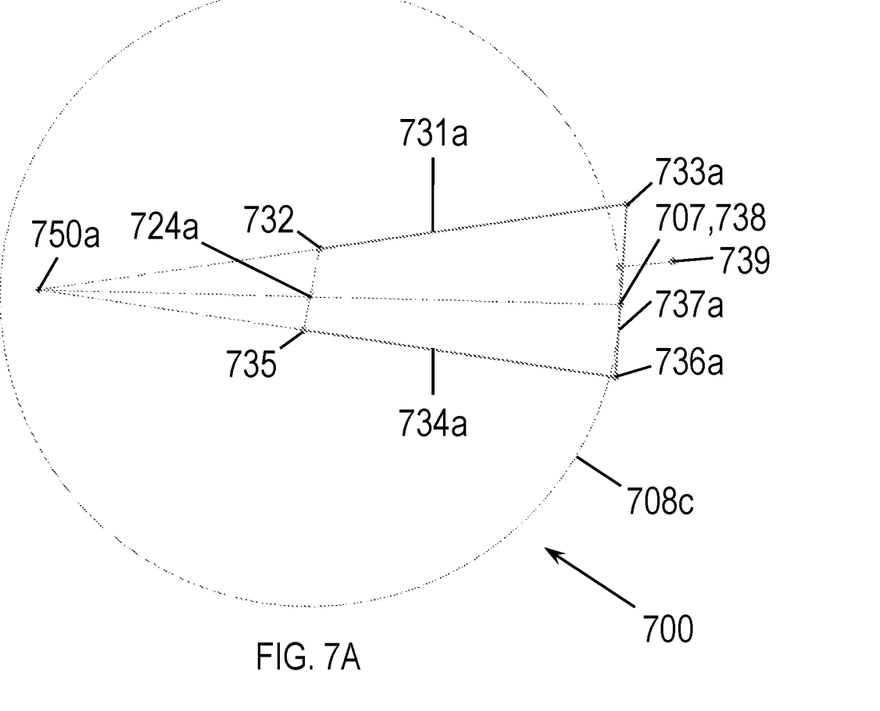
FIG. 7A shows a schematic diagram of the geometry of a rear suspension system in a maximum downward displacement state, of the embodiment shown in FIG. 4C, and according to an embodiment of the present invention.
Figure 7B:
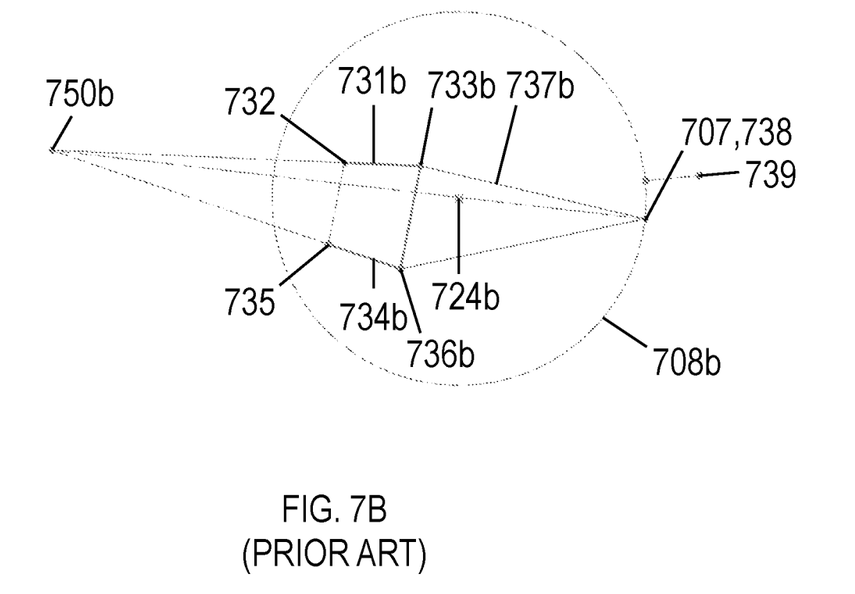
FIG. 7B shows a schematic diagram of the geometry of a rear suspension system in a maximum downward displacement state, according to the prior art.

A conventional suspension for a vehicle connects a wheel axle to a vehicle body and controls the position of a wheel with respect to the vehicle body during operation of the vehicle as shown in FIGS. 1A-1B, and dynamic operational aspects in FIGS. 5B, 6B, and 7B. More specifically, a conventional rear suspension having a trailing arm is illustrated in FIG. 1A, in which a tire/wheel 706 is mounted on an axle 707 that is transversely arranged with respect to the vehicle body, a swingarm 721 is connected to the axle 707 at a first pivot point 723 and to the vehicle body at a second pivot point 722, and a spring and/or mass damper assembly 740 that is disposed between the swingarm 721 and the vehicle body 210. Optimal handling, comfort and safety may be obtained when the tire 706 is prevented from directly transmitting an impact or vibration from a road surface to the vehicle body 210.

The length of the swingarm 721 and its vehicle body side pivot point 722 determine the transfer characteristics of a wheel impulse to the vehicle body 210. For example, a short swingarm will provide a small radius of rotation 708a for the wheel as it deflects from its normal position, which for large rotation angles, will cause some of the wheel 706 momentum to be transferred to the vehicle body 210 in a forward/reverse direction, while the remainder is transferred through the biasing 741 and mass damper 742 elements in a vertical direction. A sudden, forward/reverse motion of the vehicle is experienced by the occupants as a jolting of the vehicle. Even small amounts can lead to passenger discomfort. A long swingarm 721, on the other hand, provides a larger radius of rotation 708a thereby reducing the angle of the swingarm 721 corresponding to an equivalent vertical wheel 706 displacement. The smaller displacement angle reduces the forward/reverse component of the wheel motion while retaining the vertical component. This arrangement provides a smoother, more comfortable passenger experience.

In another aspect of the system behavior, the wheel reacts torque about the axle 707 as a force along the line 751a between the tire contact patch 709 and the swingarm pivot point 750, as illustrated in FIG. 1A. The effect of this force on the motion of the vehicle depends on the relationship of this vector 751a to the vehicle center of gravity, CG. For example, if the vector 751a passes through a point located above the CG, an accelerating torque on the wheel 706 (counterclockwise (CCW) motion in FIG. 1A) will create a CCW rotational force about the CG and cause the rear of the vehicle to lift. Conversely, if the vector 751a passes through a point located below the CG, an accelerating torque on the wheel (CCW motion) will create a clockwise (CW) rotational force about the CG and cause the rear to squat. In this way the acceleration/deceleration characteristics of the vehicle (lift/squat) may be determined by appropriate placement of the instantaneous center (IC) 750 of the rear suspension.

In other conventional designs, as represented in FIG. 1B, dual trailing links 731, 734 with distal ends 733, 736 attached to a bracket 737 including a knuckle 738 for the wheel axle 707 may be used in place of a swingarm to provide an IC for the suspension that is forward of the (proximal) linkage points 732, 735 with the vehicle body 230, thereby reducing the angle of the reaction vector 751b with respect to the road. Thus, the moment arm formed by the reaction vector 751a—b and the CG may be moved from above the CG (creating lift) to below the CG (creating squat). A required geometric condition for this arrangement is that the distance between the distal linkage points 733, 736 must be greater than the distance between the proximal linkage points 731, 734 such that lines extrapolated through the trailing links intersect at a point 750 more toward the front of the vehicle. As the distal ends of the linkage arms 733, 736 move up and down the IC 750 moves in seesaw (counteracting) fashion about a virtual fulcrum 724 on a line between the knuckle 738 and IC 750. The distance from the fulcrum 724 to the knuckle acts as an effective swingarm length 753. From FIGS. 1A and B it is evident that the rear axis locus of motion 708b with the effective swingarm has a smaller radius of curvature than the rear axis locus of motion 708a with the single beam swingarm 721. The effect of using short trailing links 731, 734 and a bracket 728, then, is to reduce the effective swingarm length 753.

Accordingly, what is needed is a rear wheel suspension system with dual trailing links and a long effective swingarm in a compact form compatible with high aerodynamic efficiency. The present invention provides such a rear wheel suspension system. Other desirable features and characteristics will become apparent from the subsequent detailed description, the drawings, and the appended claims, when considered in view of this background.

SUMMARY

It is an object of the present disclosure to provide an apparatus, system and method for a suspension system that is described without limitation in an embodiment of a rear wheel suspension system for three-wheeled vehicle and other suspension applications.

It is also an object of the present disclosure to provide an apparatus, system and method for a rear wheel suspension system with dual trailing links, a long effective swingarm and in a compact form compatible with high aerodynamic efficiency.

It is also an object of the present disclosure to provide an apparatus, system and method for a rear wheel suspension system wherein the swing arm length is maximized to provide optimum characteristics conducive with passenger comfort.

DESCRIPTION OF THE DRAWINGS

Non-limiting and non-exhaustive embodiments of the present disclosure are described with reference to the following drawings. In the drawings, like numerals describe like components throughout the several views.

For a better understanding of the present disclosure, reference will be made to the following Detailed Description, which is to be read in association with the accompanying drawings, which are incorporated in and constitute a part of this specification, show certain aspects of the subject matter disclosed herein and, together with the description, help explain some of the principles associated with the disclosed implementations, wherein.

DETAILED DESCRIPTION

Non-limiting embodiments of the invention will be described below with reference to the accompanying drawings, wherein like reference numerals represent like elements throughout. While the invention has been described in detail with respect to the preferred embodiments thereof, it will be appreciated that upon reading and understanding of the foregoing, certain variations to the preferred embodiments will become apparent, which variations are nonetheless within the spirit and scope of the invention. The drawings featured in the figures are provided for the purposes of illustrating some embodiments of the invention and are not to be considered as limitation thereto.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "some embodiments", "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are provided for the purposes of illustrating some embodiments of the present disclosure and are not to be considered as a limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As illustrated in FIGS. 2A-5A, 6A, and 7A a vehicle suspension apparatus, system, and method of the present invention is generally shown as element 700. As displayed in FIG. 2A, a rear suspension 720 for a three-wheeled vehicle is operably connected to a rear subframe 230. The rear suspension assembly 720 is further connected to a wheel 705 and tire 706 assembly. In FIG. 2B, the wheel 705 and tire 706 are omitted so that the elements of the rear suspension assembly 720 may be seen more clearly. The rear suspension comprises dual trailing links 731, 734 connected to a rear upright bracket 737. The lower trailing link 734 is further connected to a spring/mass damper assembly 740.

Figure 3A:
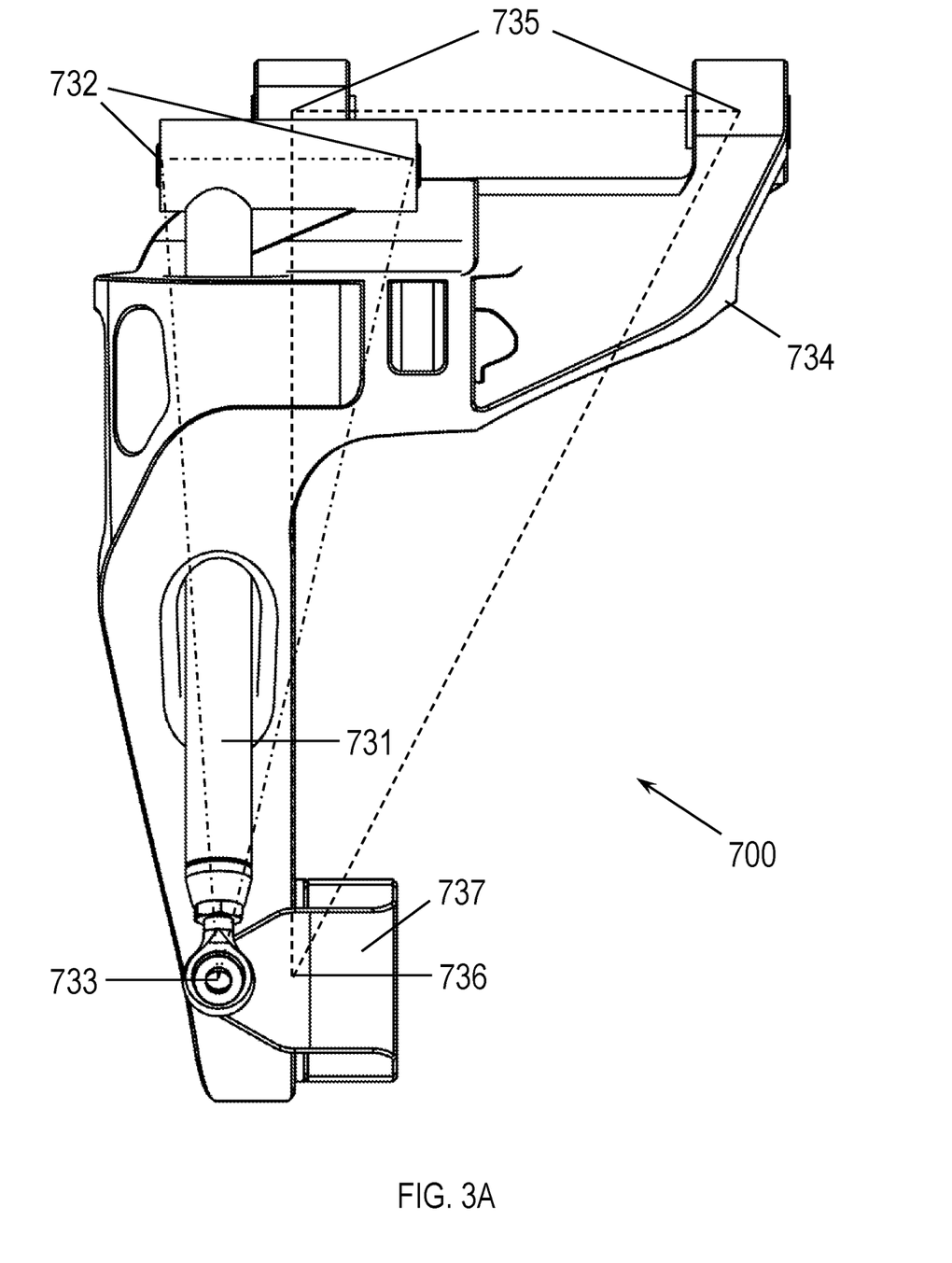
FIG. 3A illustrates a top view of the dual trailing links and upright bracket, according to an embodiment of the present invention.
Figure 3B:
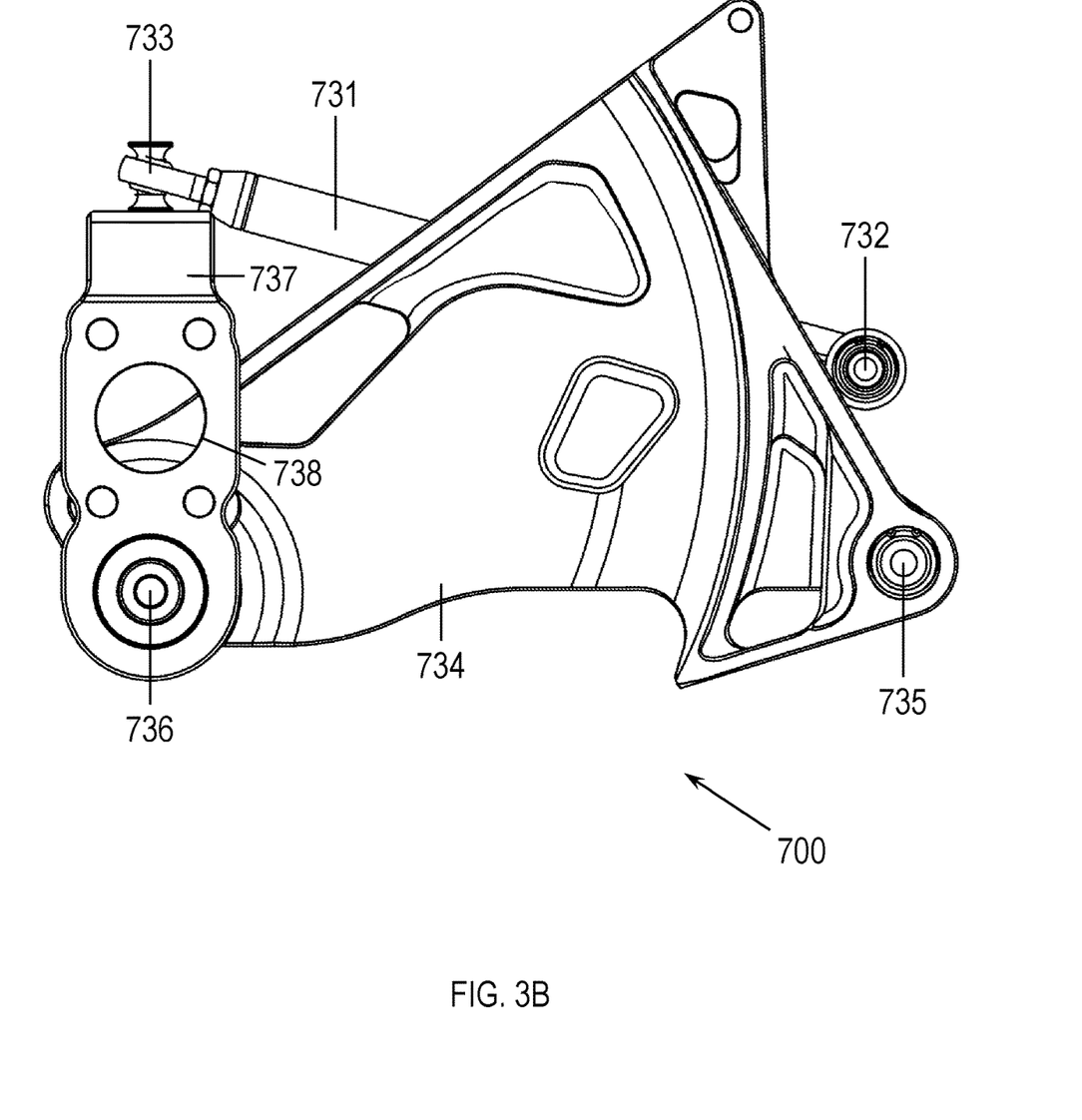
FIG. 3B illustrates a right-side view of the dual trailing links and upright bracket, according to an embodiment of the present invention.

Referring to FIG. 3A, the upper 731 and lower 734 trailing links take the form of a double-A arm configuration, shown as dashed lines. The upper A arm is denoted by a dashed-dotted line and may comprise proximal pivot points 732 and a distal pivot point 733. The lower A arm is denoted by a dashed line and may comprise proximal pivot points 735 and a distal pivot point 736. FIG. 3B shows the orientation of the dual trailing links 731, 734 in the plane of motion, which is coincident with the plane of the page. The proximal pivot points 732, 735 have a smaller distance between them than the distal pivot points 733, 736, thereby satisfying the requirement for forming an IC that is forward of the proximal pivot points 732, 735. The distal pivot points 733 and 736 may be coupled to the top and bottom, respectively, of an upright 737 with a knuckle 738 oriented perpendicular to the plane of motion of the trailing links 731, 734. The distal pivot points 733, 736 may be positioned substantially vertically with respect to the axle of the wheel.

Such an arrangement is important for maximizing the effective swingarm length, as will be discussed later.

Figure 4A:
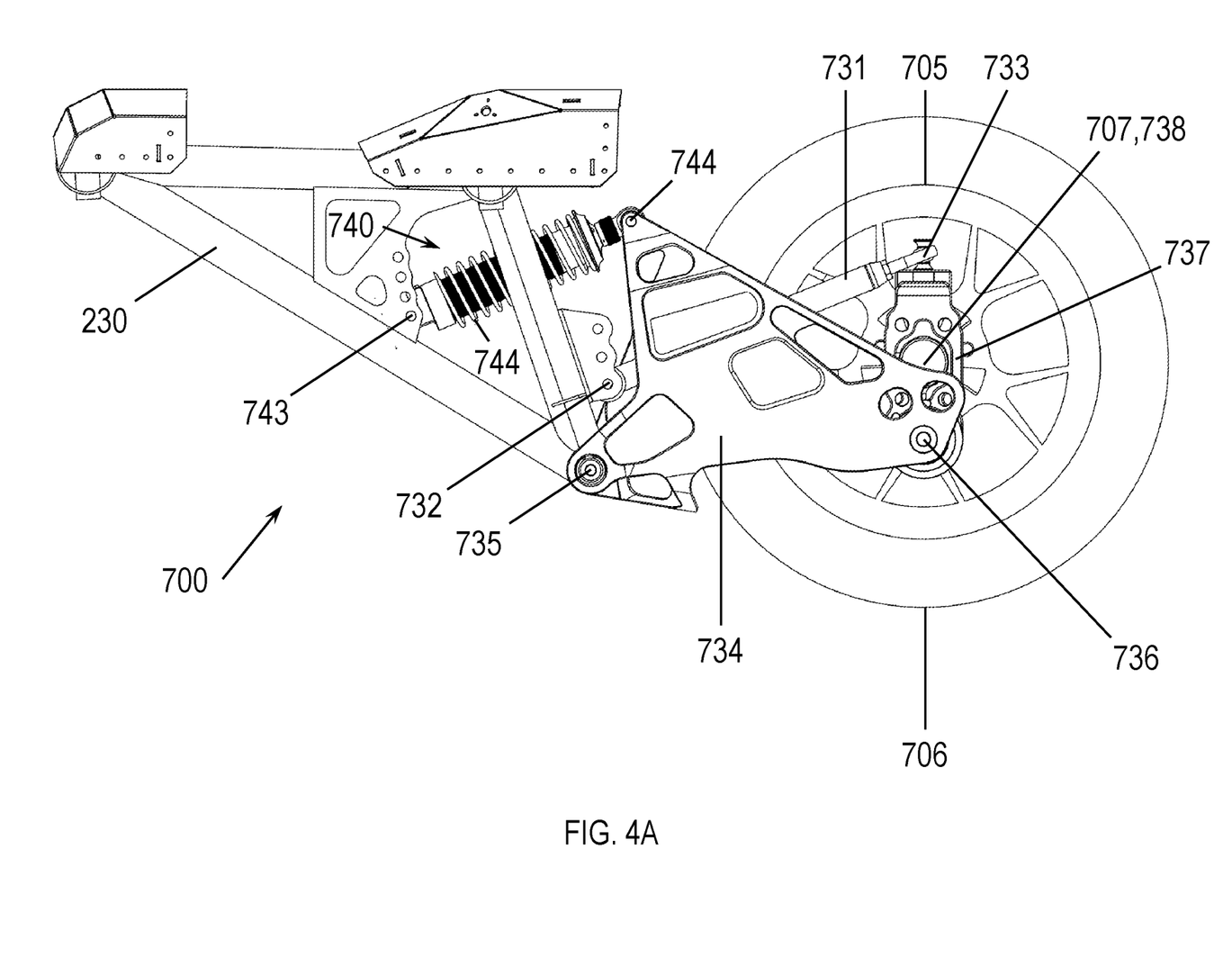
FIG. 4A illustrates a left-side view of the rear subframe and rear suspension system in a maximum upward displacement state, according to an embodiment of the present invention.
Figure 4B:
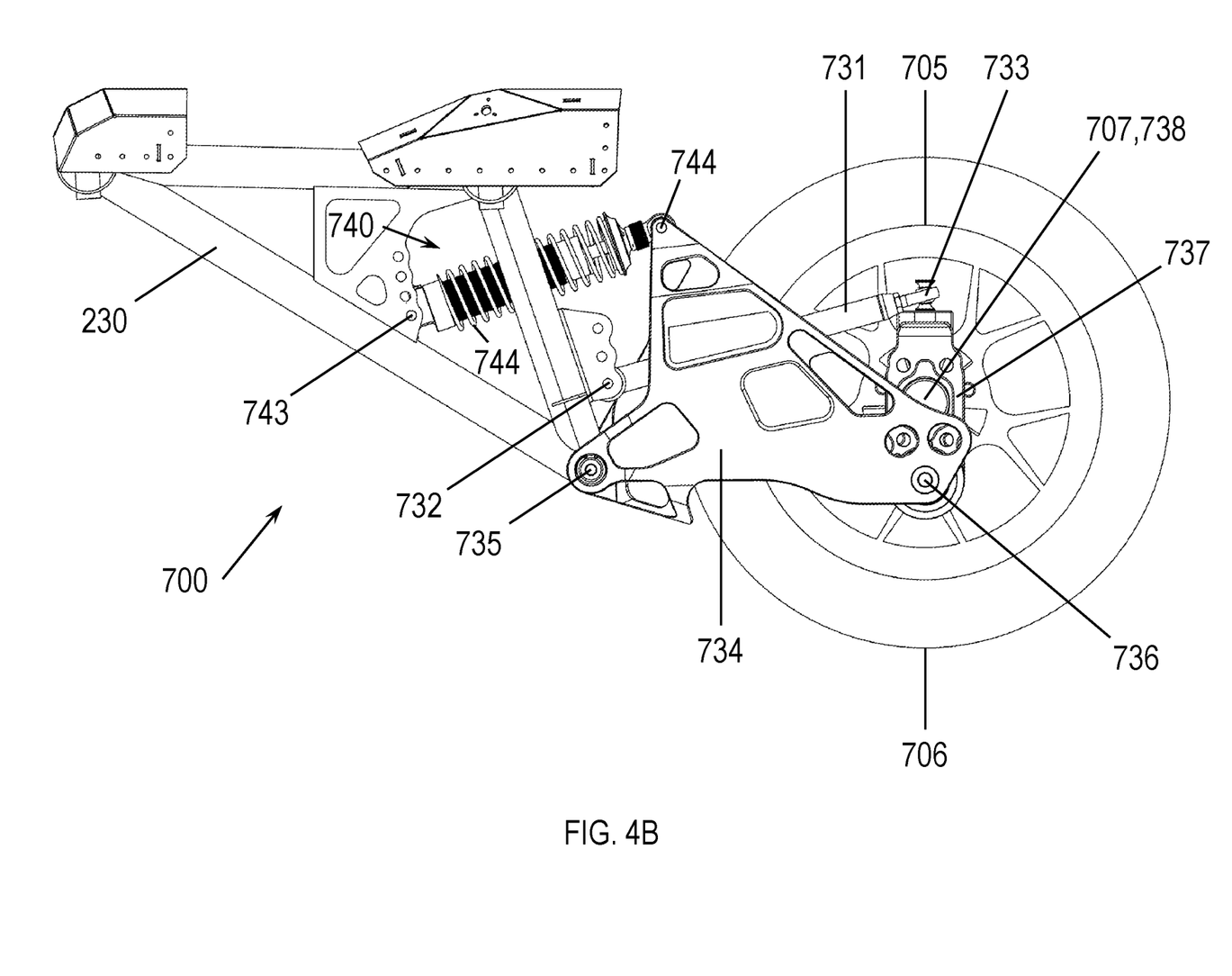
FIG. 4B illustrates a left-side view of the rear subframe and rear suspension system in a neutral state, according to an embodiment of the present invention.
Figure 4C:
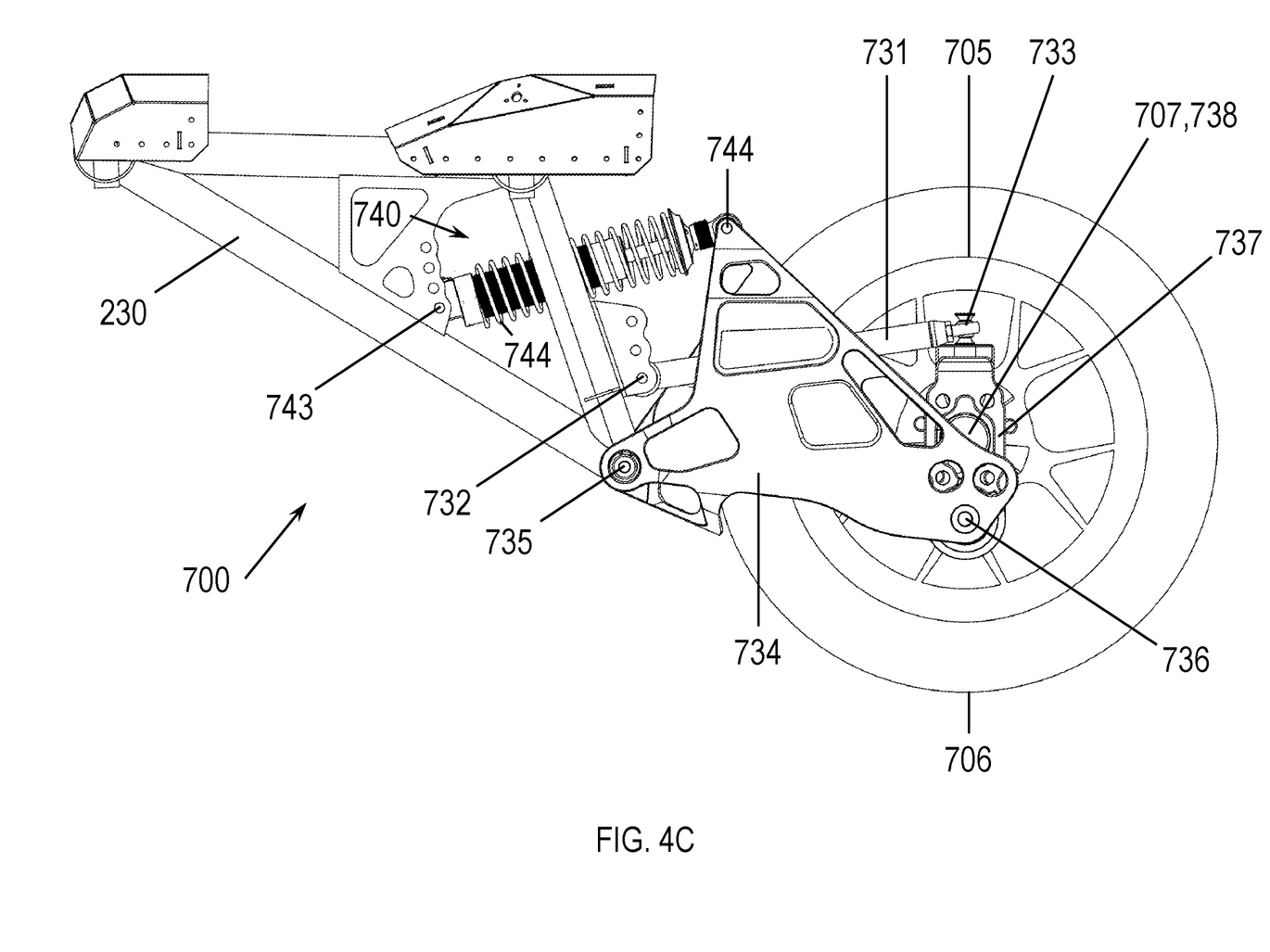
FIG. 4C illustrates a left-side view of the rear subframe and rear suspension system in a maximum downward displacement state, according to an embodiment of the present invention.

The motion of the rear suspension system 720 may be viewed through FIG. 4A-C. In FIG. 4A, the wheel 705 and tire 706 are shown in a configuration corresponding to their maximum upward travel. The dual trailing links 731, 734 are coupled at proximal ends 732, 735 to the rear subframe 230 and at distal ends 733, 736 to the rear upright 737. The wheel axle 707 is mounted to and coincident with the knuckle 738. The spring/mass damper assembly 740 may be coupled at a proximal end 743 to the rear subframe 230 and at a distal end 744 to the lower trailing link 734. In FIG. 4B, the wheel 705 and tire 706 are shown in a configuration corresponding to their neutral position and the spring 741 has nominal compression. In FIG. 4C, the wheel 705 and tire 706 are shown in a configuration corresponding to their maximum downward travel and the spring 741 is uncompressed. The total vertical travel of the wheel in this embodiment may be approximately 100 mm. Alternatively, the total vertical travel of the wheel and/or suspension assembly may be greater or less than 100 mm, as appropriate for, e.g., variations in vehicle geometry, weight characteristics, and/or location of the center of gravity.

The relative advantage of the configuration of the present invention may be more easily understood through FIGS. 5A-7B illustrating a kinematic model showing the operation, or the dynamic motion, of the suspension system 700 shown in FIGS. 4A-4C. For example, FIG. 5A illustrates the geometry of the rear suspension system 700 in a maximum upward displacement state of the suspension system 700 of FIG. 4A, FIG. 6A illustrates a mid-point displacement or neutral state of the suspension system 700 in FIG. 4B, and FIG. 7A illustrates the maximum downward displacement of the suspension system 700 in FIG. 4C. Conversely, FIGS. 5B, 6B, and 7B, illustrate a kinematic model of conventional suspension systems and, when compared to the corresponding embodiments shown in FIGS. 5A, 6A, and 7A, the advantage of the present invention is clearly shown.

FIG. 5A illustrates the kinematic arrangement corresponding to FIG. 4A using dual trailing links 731a, 734a that comprise proximal pivot points 732, 735 that are fixed relative to the chassis and distal pivot points 733a, 736a that rotate about the proximal ends 732, 735. The distal pivot points 733a, 736a are connected by an upright 737a with a knuckle 738 coincident with the wheel axle 707. A dashed line 739 represents the neutral point of the suspension system. The IC may be located by extending the axes of the upper 731a and lower 734a trailing links and finding their intersection 750a. This arrangement may be compared with a conventional, dual trailing link configuration according to FIG. 5B, also shown in its maximum upward displacement state. In this approach, trailing links 731b, 734b comprise proximal pivot points 732, 735 that are fixed relative to the chassis and distal pivot points 733b, 736b that rotate about the proximal ends 732, 735. The distal pivot points 733b, 736b are connected to a bracket 737b that extends the remaining distance to the wheel axle 707 and is attached thereto by a knuckle 738. A dashed line 739 represents the neutral point of the suspension system. In a similar way, the IC of this configuration may be located by extending the axes of the upper 731b and lower 734b trailing links and finding their intersection 750b.

In FIG. 6A the geometry of the rear suspension systems is exhibited in a neutral state corresponding to the embodiment shown in FIG. 4B, while FIG. 6B illustrates a corresponding conventional configuration. FIG. 7A shows the geometry of the rear suspension systems in a maximum downward displacement state corresponding to the geometry shown in FIG. 4C, while FIG. 7B illustrates a corresponding conventional configuration.

In FIGS. 5A through 7B, the mechanics of the various rear suspension geometries is shown. Note that, in the configurations of FIGS. 5A through 7B, the proximal pivot points 732, 735 and their distances from the axle/knuckle 707, 738 are identical, while the trailing link angles produce identical ICs 750a—b in a neutral state. In this way, the aspects of the present invention to conventional suspensions may be accurately compared as between these configurations. In a first aspect, the ICs 750a—b move in seesaw (counteracting) fashion relative to the axle/knuckle 707, 738 and should therefore not be construed as the pivot point for the axle/knuckle 707, 738. Instead, the virtual pivot point (VPP) of the axle 707 corresponds to the fulcrum 724a—b of the seesaw, which is significantly different between the present invention and a conventional suspension.

In the case of the present invention of FIGS. 5A, 6A & 7A, the VPP/fulcrum 724a is approximately midway between the proximal ends 732, 735 of the upper and lower trailing links 731a, 734b. In the case of the conventional geometry (dual trailing links with extending bracket) of FIGS. 5B, 6B & 7B, the VPP/fulcrum 724b is almost midway between the proximal ends 732, 735 of the upper and lower trailing links 731b, 734b and the axle/knuckle 707, 738. The distance between the VPP 724a-b and the axle/knuckle 707, 738 is the effective swingarm length and is equal to the radius of the circle 708b—c describing the motion of the axle/knuckle 707, 738. In the case of the present invention, the effective swingarm length is maximized by making the distal pivot points 733a, 736a colinear, and, in this case, substantially vertically oriented with the axle/knuckle 707, 738. In the case of the conventional geometry, the effective swingarm length is considerably shortened relative to the present invention. Thus, the circle of motion 708c induced by the geometry of the present invention is much larger than the circle of motion 708b induced by the conventional geometry. This results in a more vertical motion of the axle/knuckle 707, 738 under road induced deflection and a more comfortable ride for the vehicle occupants.

A rear wheel vehicle suspension system 700 has been described with embodiments corresponding to dual trailing links 720, wherein an effective swingarm length can be maximized for vertical shock absorption by making the distal pivot points substantially colinear with axle/knuckle. The orientation of the line connecting the distal pivot points with the axle/knuckle need not be vertical in order to maximize the effective swingarm length; only deviations from collinearity will reduce the effective swingarm length. The present disclosure. in one aspect, makes maximum use of the space allotted for the rear suspension system—that is, the embodiment contemplated herein provides the greatest effective swingarm length for a given distance between the vehicle chassis and the wheel. This arrangement is therefore advantageous for certain vehicle designs, such as in an aerodynamic vehicle where the rear suspension is surrounded by an aerodynamic cowling which severely limits the available space. Applications for concepts according to the present invention are, however, not limited thereto, and may be applicable to, e.g., four-wheeled or two-wheeled vehicles, front wheel applications, vehicles having geometric limitations dictated by design constraints other than aerodynamic considerations, and/or vehicles having alternative lift and squat characteristics, as the design may require.

The previous description of the disclosed embodiments is provided to enable any person skilled in the art to make or use the invention. Various modifications to these embodiments will be readily apparent to those skilled in the art, and the principles defined herein can be applied to other embodiments without departing from the spirit or scope of the invention. It is therefore desired that the present embodiments be considered in all respects as illustrative and not restrictive, reference being made to the appended claims as well as the foregoing descriptions to indicate the scope of the invention.

What is claimed is:

1. A rear suspension system for operably coupling one rear wheel of a three-wheeled vehicle to a support frame, said one rear wheel comprising a tire mounted on a rim with a wheel axle, the rear suspension system comprising:
- a bracket comprising an upright having a top upright end, and a bottom upright end, and a knuckle at a middle portion disposed between said top upright end and said bottom upright end thereof for mounting the wheel axle coincident with said knuckle, said knuckle being operably coupled to the wheel axle and said bracket is disposed inside of a circumference of the rim;
- an upper link comprising a line characterized by an upper proximal end and an upper distal end, said upper proximal end being rotatably coupled to the support frame disposed outside of a circumference of the one rear wheel, and said upper distal end being rotatably coupled to said bracket at said top upright end;
- a lower link comprising a line characterized by a lower proximal end and a lower distal end, said lower proximal end being rotatably coupled to the support frame outside of said circumference of the one rear wheel, said lower distal end being rotatably coupled to said bracket at said bottom upright end, wherein said upper and lower link lines diverge from said proximal ends to said distal ends; and
- a spring/mass damper assembly having a proximal end and a distal end, said proximal end rotatably coupled to a rear subframe at a point about the level of said top upright end, said distal end rotatably connected to said lower link at a point above the connection of said proximal end to said rear subframe;
- wherein a rotational axis of the one rear wheel being disposed perpendicular to a first line formed by said upper proximal and upper distal ends, said upper and lower distal ends being disposed within said circumference of the one rear wheel rim;
- wherein said upper and lower distal ends of said upper and lower links define a line that intersects said rotational axis.

2. The rear suspension system of claim 1 wherein said knuckle is pivotably coupled to said rotational axis of the one rear wheel.

3. The rear suspension system of claim 1, wherein said rear suspension system is at least partially enclosed within an aerodynamic cowling, wherein the aerodynamic cowling is disposed forward of the one rear wheel between an instantaneous center and a virtual pivot point thereof.

4. A rear suspension system for operably coupling a first rear wheel of a vehicle to a support frame, said first rear wheel comprising a tire mounted on a rim with a wheel axle, the rear suspension system comprising:
- a bracket comprising an upright having a top upright end, and a bottom upright end, and a knuckle at a middle portion disposed between said top upright end and said bottom upright end thereof for mounting the wheel axle coincident with said knuckle, said knuckle being operably coupled to the one rear wheel axle and said bracket is disposed inside of a circumference of the rim, said middle portion, being pivotably coupled to the first rear wheel on a rotational axis of the one rear wheel;
- an upper link comprising a line characterized by an upper proximal end and an upper distal end, said upper proximal end being rotatably coupled to the support frame disposed outside of a circumference of the first rear wheel, and said upper distal end being rotatably coupled to said bracket at said top upright end;
- a lower link comprising a line characterized by a lower proximal end and a lower distal end, said lower proximal end being rotatably coupled to the support frame outside of said circumference of the first rear wheel, said lower distal end being rotatably coupled to said bracket at said bottom upright end, wherein said upper and lower link lines diverge from said proximal ends to said distal ends; and
- a spring/mass damper assembly having a proximal end and a distal end, said proximal end rotatably coupled to a rear subframe at a point about the level of said top upright end, said distal end rotatably connected to said lower link at a point above the connection of said proximal end to said rear subframe;
- wherein said rotational axis being disposed perpendicular to a first line formed by said upper proximal and upper distal ends, said upper and lower distal ends being disposed within said circumference of the first rear wheel rim;
- wherein said upper and lower distal ends of said upper and lower links define a line that intersects said rotational axis.

5. The rear suspension system of claim 4, wherein said rear suspension system is at least partially enclosed within an aerodynamic cowling, wherein the aerodynamic cowling is disposed forward of the first rear wheel between an instantaneous center and a virtual pivot point thereof.

* * * * *